(12) United States Patent
Morris

(10) Patent No.: US 7,717,455 B2
(45) Date of Patent: May 18, 2010

(54) ADAPTABLE TRAILER DRAWBAR ASSEMBLY

(75) Inventor: James C. Morris, Penticton (CA)

(73) Assignee: Danik Industries Ltd., Penticton (CA)

( * ) Notice: Subject to any disclaimer, the term of this patent is extended or adjusted under 35 U.S.C. 154(b) by 7 days.

(21) Appl. No.: 12/169,530

(22) Filed: Jul. 8, 2008

(65) Prior Publication Data

US 2010/0007117 A1 Jan. 14, 2010

(51) Int. Cl.
*B60D 1/00* (2006.01)
(52) U.S. Cl. .................................. 280/506; 280/491.5
(58) Field of Classification Search ............. 280/506, 280/507, 491.5, 483, 495; 403/294, 379.3
See application file for complete search history.

(56) References Cited

U.S. PATENT DOCUMENTS

| | | | | |
|---|---|---|---|---|
| 5,593,172 A | * | 1/1997 | Breslin | 280/506 |
| 5,615,904 A | * | 4/1997 | Van Dusen et al. | 280/506 |
| 5,850,959 A | | 12/1998 | Miller | |
| 6,105,989 A | * | 8/2000 | Linger | 280/506 |
| 6,131,938 A | * | 10/2000 | Speer | 280/506 |
| 6,142,502 A | * | 11/2000 | Breslin | 280/506 |
| 6,183,167 B1 | * | 2/2001 | Ruiz et al. | 405/251 |
| 6,334,561 B1 | | 1/2002 | Cole | |
| 6,382,656 B1 | * | 5/2002 | Johnson, Jr. | 280/506 |
| 6,733,029 B2 | * | 5/2004 | McCoy et al. | 280/506 |
| 6,834,879 B1 | * | 12/2004 | Lorman | 280/506 |
| 6,863,294 B1 | * | 3/2005 | Bonham | 280/479.2 |
| 6,945,550 B2 | | 9/2005 | Williams | |
| 7,004,491 B1 | * | 2/2006 | Allsop et al. | 280/506 |

OTHER PUBLICATIONS

Hollywood Racks, Receiver Tube, Dual Size 1 ¼"& 2" (used on HR6500/8500) (RT6500), http://www.hollywoodracks.com/parts-accessories/RT6500.htm4/24/2008.

* cited by examiner

*Primary Examiner*—Tony H. Winner
(74) *Attorney, Agent, or Firm*—Blakely Sokoloff Taylor & Zafman, LLP

(57) ABSTRACT

A drawbar assembly includes a shank that can slidingly engage a first hitch receiver having an interior opening with a first size, which may be a class I receiver with a one and one-quarter inch square opening and provisions for a one-half inch hitch pin. First and second adapter parts, each having two sides forming a right angle, are removably coupled to the shank on opposite sides. The drawbar assembly can slidingly engage a second hitch receiver having an interior opening with a second size, which may be a class III receiver with a two inch square opening and provisions for a five-eighths inch hitch pin. A threaded hitch pin may clamp the drawbar assembly to the receiver.

16 Claims, 3 Drawing Sheets

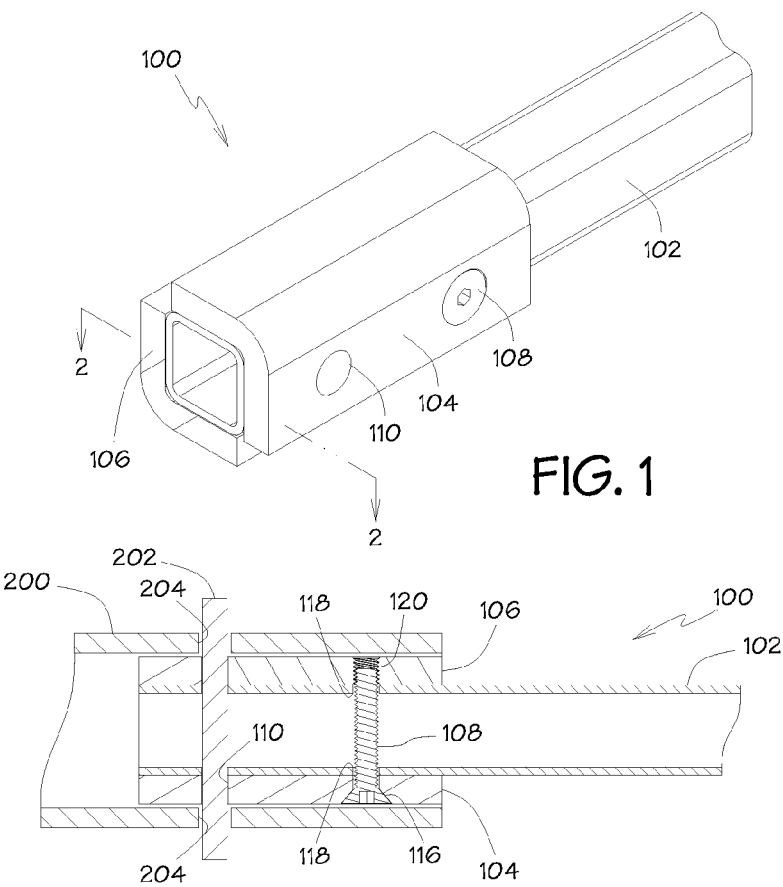
FIG. 1
FIG. 2
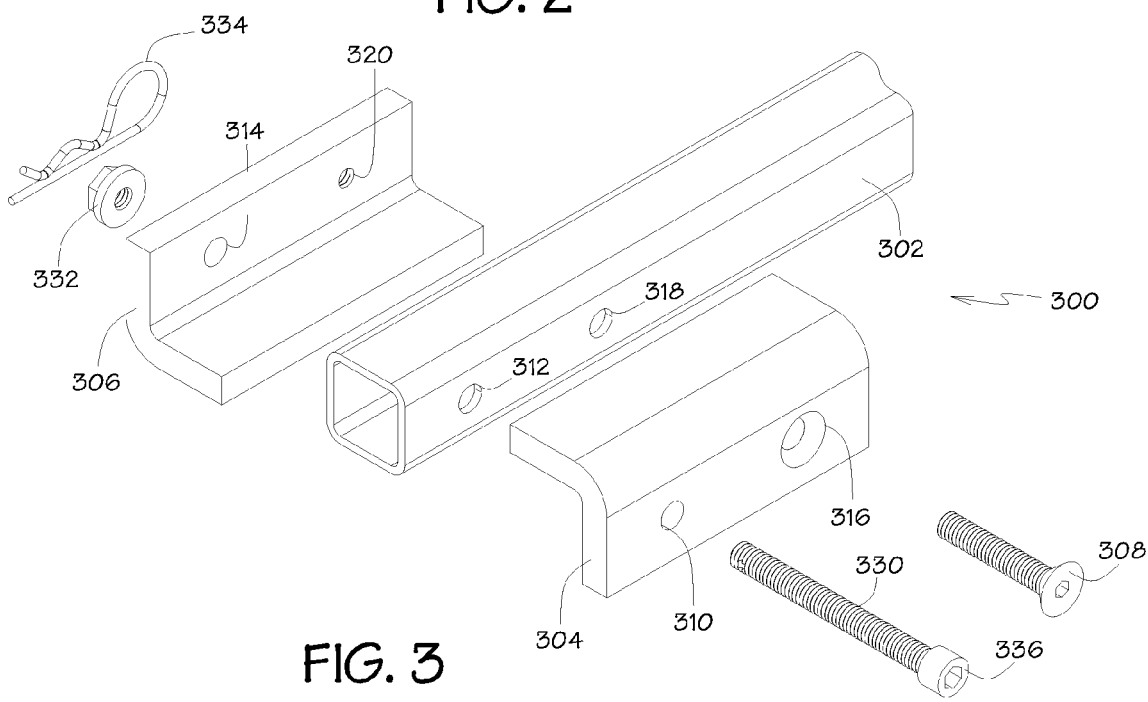
FIG. 3

ADAPTABLE TRAILER DRAWBAR ASSEMBLY

BACKGROUND

1. Field

Embodiments of the invention relate to the field of vehicle load carriers; and more specifically, to coupling vehicle load carriers to a trailer hitch receiver.

2. Background

Many automobiles are equipped with a trailer hitch receiver which is generally a square tube that is securely coupled to the frame of the vehicle and capable of receiving a towing load. A tow hitch may be inserted into the receiver and secured by a hitch pin to provide an attachment for a trailer. The receiver provides a secure connection to the vehicle without requiring the actual trailer attachment, which may be a bulky protrusion, to be left in place permanently.

The receiver may provide a convenient means for attaching other accessories to a vehicle in addition to a tow hitch. For example, cargo bins or platforms and carriers for recreational gear such as bicycles, skis, and surfboards may be securely coupled to a vehicle using the receiver.

Receivers may be provided in various sizes based on the towing load they are capable of safely handling. For example, a class I receiver has a nominal one and one-quarter inch square opening and is rated for 200 pounds of tongue weight and a class III receiver has a nominal two inch square opening and is rated for 600 pounds of tongue weight.

When accessories are provided to be attached to a receiver, it may be necessary to provide models with different drawbars to be inserted into the receiver to accommodate the different sizes of receivers even though the greater load capacity is not required. This may require keeping more models of the accessory in inventory. This may also require the consumer to purchase a new accessory or a cumbersome adapter if they want to use the accessory on a vehicle having a different size of receiver.

It would be desirable to have a way of efficiently providing an accessory that can be used with more than one size of receiver.

SUMMARY

A drawbar assembly includes a shank that can slidingly engage a first hitch receiver having an interior opening with a first size, which may be a class I receiver with a one and one-quarter inch square opening and provisions for a one-half inch hitch pin. First and second adapter parts, each having two sides forming a right angle, are removably coupled to the shank on opposite sides. The drawbar assembly can slidingly engage a second hitch receiver having an interior opening with a second size, which may be a class III receiver with a two inch square opening and provisions for a five-eighths inch hitch pin. A threaded hitch pin may clamp the drawbar assembly to the receiver.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 1 is a perspective view of a drawbar assembly that embodies the invention.

FIG. 2 is a cross-sectional view of the drawbar assembly of FIG. 1 along section line 2-2 with an exemplary receiver.

FIG. 3 is an exploded view of another drawbar assembly that embodies the invention.

DETAILED DESCRIPTION

Figure 4A:
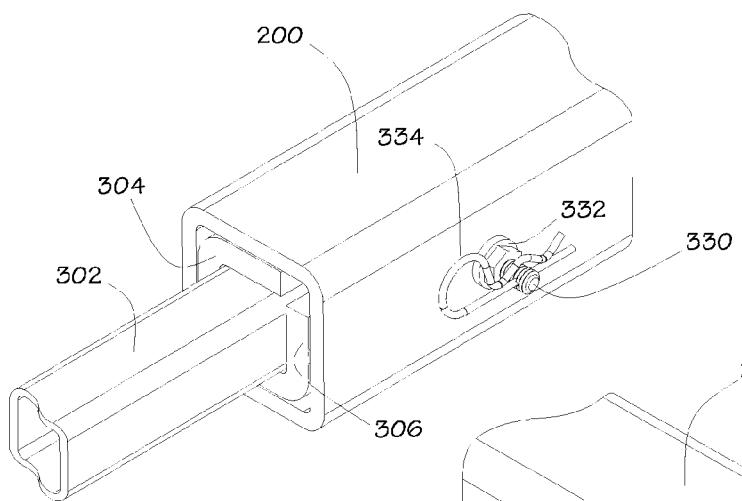
FIG. 4A is a perspective view of the drawbar assembly of FIG. 3 with a large exemplary receiver from a first direction.

In the following description, numerous specific details are set forth. However, it is understood that embodiments of the invention may be practiced without these specific details. In other instances, well-known circuits, structures and techniques have not been shown in detail in order not to obscure the understanding of this description.

FIG. 1 shows a drawbar assembly 100 that embodies the invention. The drawbar assembly includes a shank 102 that can slidingly engage a first hitch receiver having an interior opening with a first size. The first hitch receiver may be a class I receiver with a cross-section that is nominally one and one-quarter inches square. Therefore the shank for a class I receiver may have a cross-section that is approximately one and one-quarter inches square. "Approximately" for the purposes of this application is intended to mean that the approximate dimension is such that it is sufficiently close to the given dimension to serve the intended purpose. For example, a shank that is approximately one and one-quarter inches square may be one and three-sixteenths inches square to provide clearance to permit a sliding engagement with the receiver.

A first adapter part 104 and a second adapter part 106 each have two sides forming a right angle. The first and second adapter parts are removably coupled to the shank 102 with the second adapter part coupled to the shank opposite the first adapter part. The two adapter parts therefore rest against the four sides of the shank to provide a second, large cross-section having a size and a shape that can slidingly engage a second hitch receiver having an interior opening with a second size that is substantially larger than the first size. The second hitch receiver may be a class III receiver with a cross-section that is nominally two inches square. If the first hitch receiver is a class I receiver and the second hitch receiver is a class III receiver, then each of the sides of the first and second adapter parts may be approximately three-eighths of an inch thick.

The drawbar assembly 100 thus provides the shank 102 without the adapter parts for slidingly engaging a first hitch receiver that may have an interior cross section that is approximately one and one-quarter inches square. The drawbar assembly 100 further provides the shank 102 with the adapter parts 104, 106 for slidingly engaging a second hitch receiver that may have an interior cross section that is approximately two inches square. The drawbar assembly 100 may be provided to a consumer with the adapter parts 104, 106 coupled to the shank 102. The consumer may remove the adapter parts 104, 106 if the drawbar assembly 100 is to be used with a smaller receiver.

A threaded fastener 108 may couple the first 104 and second 106 adapter parts to the shank 102. The use of the threaded fastener 108 may be seen in FIG. 2 which is a cross-section view of the drawbar assembly 100 along section line 2-2 in FIG. 1. The shank 102 may include a passage 118 through which the threaded fastener 108 passes. The first adapter part 104 may include a recessed opening 116 that receives a head of the threaded fastener 108. The head of the threaded fastener may be a flat head and the recessed opening may be a countersink as shown in the Figures. The second adapter part 106 may include a threaded opening 120 that receives the threaded fastener 108. The first 104 and second 106 adapter parts may be coupled to the shank 102 by the clamping force created by the threaded fastener 108 drawing the adapter parts together. Preferably the threaded fastener 108 is received by the adapter parts in such a way that the threaded fastener is entirely within the outer surfaces of the adapter parts.

FIG. 2 also shows an exemplary second receiver 200 that illustrates how the drawbar assembly 100 slidingly engages the receiver. The receiver 200 may include a pair of hitch pin openings 204 to secure the drawbar assembly 100 within the receiver by passing a hitch pin 202 through the hitch pin openings and passages 110 in the shank 102 and adapter parts 104, 106. Receivers of different sizes may provide hitch pin openings of different sizes. For example, a class I receiver provides nominal one-half inch hitch pin openings and a class III receiver provides nominal five-eights inch hitch pin openings. This may result in the passages 110 in the shank 102 and adapter parts 104, 106 that receive the hitch pin 202 being of substantially different sizes than the hitch pin openings 204 provided by the receiver. It may be desirable to provide an anti-rattle mechanism to secure the drawbar assembly 100 within the receiver 200 in a manner that substantially eliminates relative movement between the drawbar assembly and the receiver.

FIG. 3 is an exploded view of another drawbar assembly 300. This drawbar assembly 300 is generally similar to the drawbar assembly 100 shown in FIGS. 1 and 2. This embodiment of the drawbar assembly 300 includes a shank 302 with adapter parts removably coupled to the shank by coupling the first adapter part 304 to the second adapter part 306 with a threaded fastener 308 that passes through a passage 318 in the shank and engages a threaded opening 320 in the second adapter part. The threaded fastener 308 may include a flat head that is received in a countersunk opening 316 in the first adapter part 304.

A threaded hitch pin 330 may provide an anti-rattle mechanism to secure the drawbar assembly 300 within a receiver. As shown, the threaded hitch pin 330 may include a socket head which may be sized such that the socket head can pass through the smallest hitch pin openings that will be used with the threaded hitch pin. For example, the threaded hitch pin 330 may be a conventional 5/16-18 socket head cap screw with a head diameter of 15/32 of an inch. This head diameter will fit within a nominal one-half inch hitch pin opening of a class I receiver. A threaded nut 332 may be provided to secure the threaded hitch pin 330. A hairpin cotter pin 334 may be coupled to the threaded hitch pin 330 for provide a safety backup to the threaded nut 332.

Figure 4B:
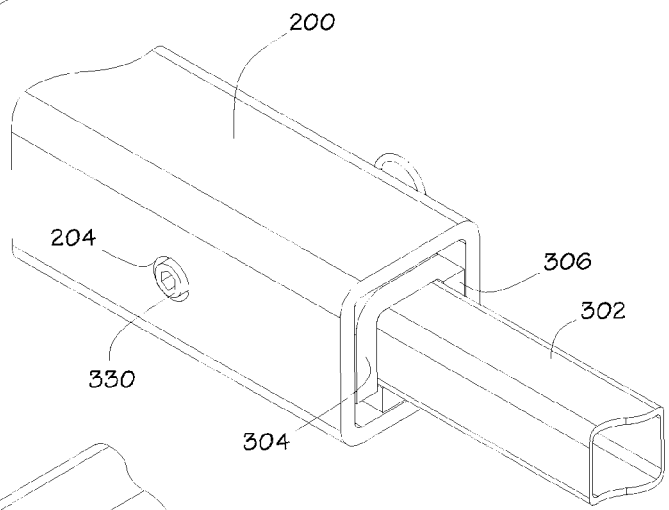
FIG. 4B is a perspective view of the drawbar assembly of FIG. 3 with the exemplary receiver from a second direction.
Figure 5A:
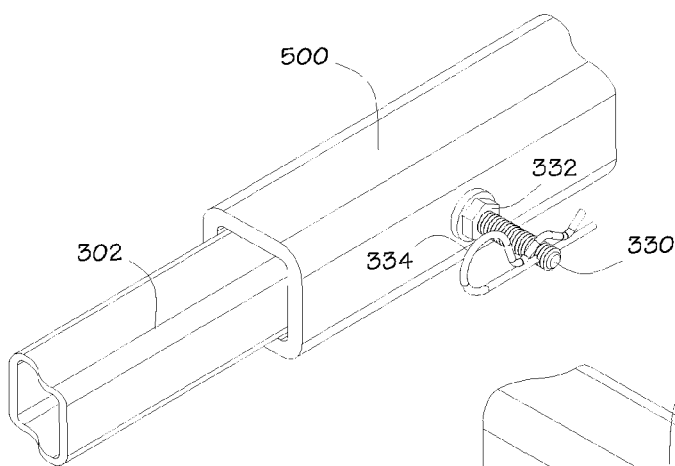
FIG. 5A is a perspective view of the drawbar assembly of FIG. 3 with a small exemplary receiver from a first direction.
Figure 5B:
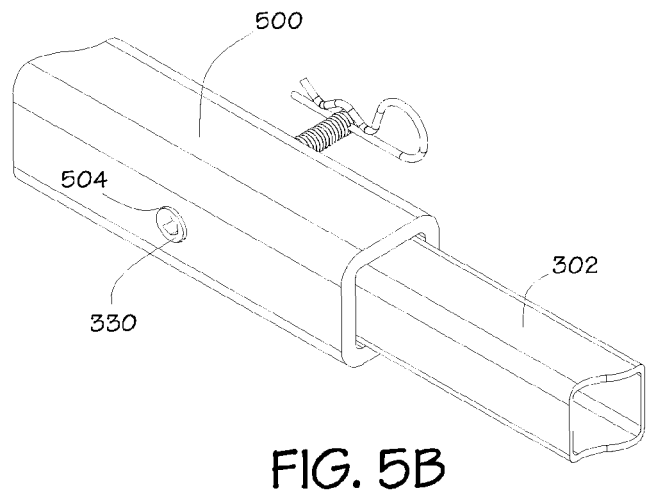
FIG. 5B is a perspective view of the drawbar assembly of FIG. 3 with the exemplary receiver from a second direction.

FIGS. 4A and 4B show the drawbar assembly 300 of FIG. 3 coupled to the second receiver 200. FIGS. 5A and 5B show the shank 302 of FIG. 3 coupled to a first receiver 500. The operation of the threaded hitch pin 330 may be appreciated from these Figures. The threaded hitch pin 330 includes a head and a threaded pin. The threaded pin passes through a passage 312 in the shank and through a first hitch pin opening in either the first or second hitch receiver. In this embodiment, the passage 312 is smaller than the hitch pin opening in either receiver. The head fits within a second hitch pin opening 504, 204 in either the first 500 or second 200 hitch receiver as best seen in FIGS. 5B and 4B. The head of the threaded hitch pin 330 will bear against the shank 302, either directly or through the coupled adapter plate 304, adjacent the passage 312, 310 because the head is too small to engage the receiver but is larger than the passage in the drawbar assembly. The threaded nut 332 is coupled to the threaded pin 308 such that the nut bears against either the first 500 or second 200 hitch receiver adjacent the first hitch pin opening and clamps the drawbar assembly 300 to the hitch receiver as best seen in FIGS. 4A and 5A.

Figure 6:
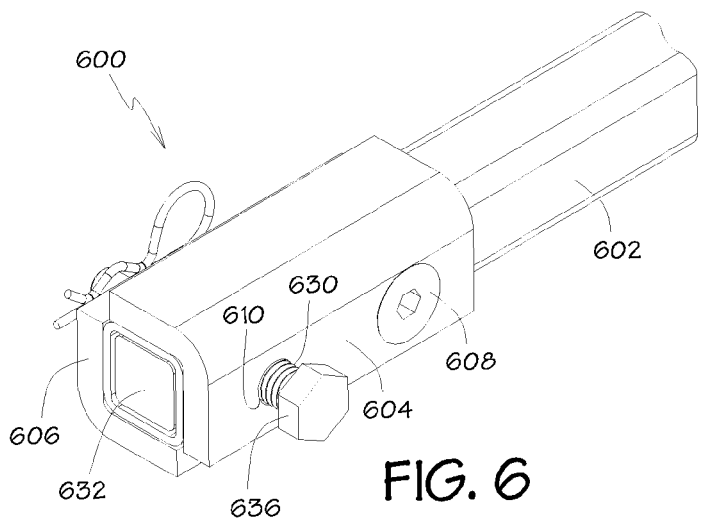
FIG. 6 is a perspective view of another drawbar assembly that embodies the invention.
Figure 7:
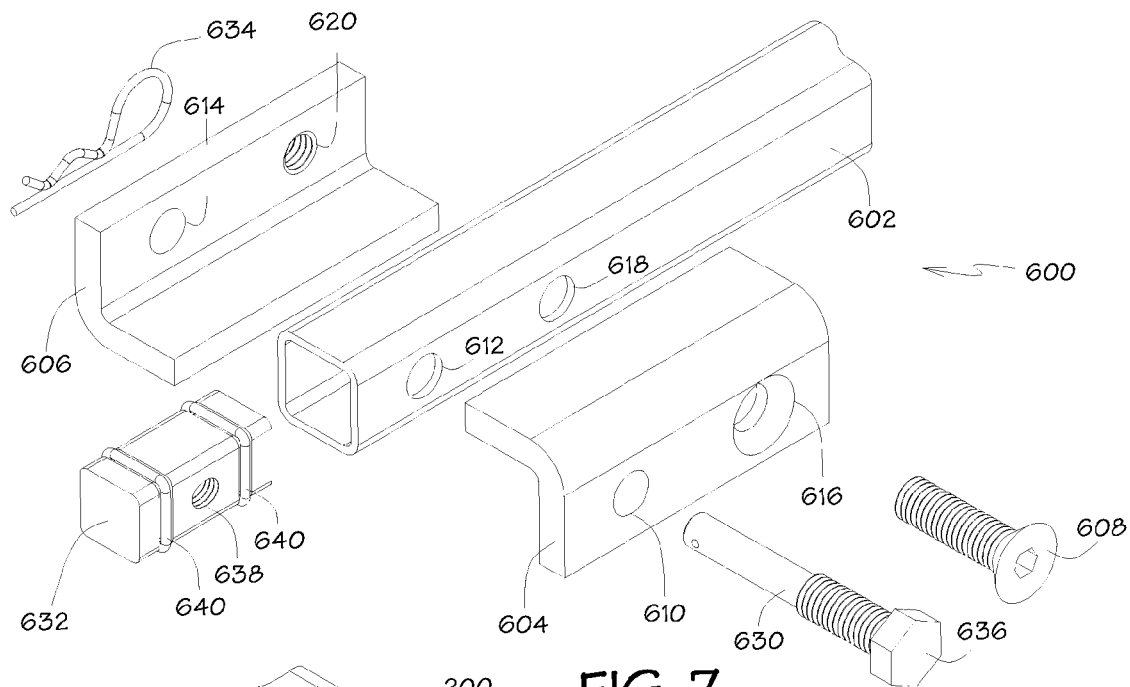
FIG. 7 is an exploded view of the drawbar assembly of FIG. 6.

FIG. 6 is perspective view of another drawbar assembly 600. FIG. 7 is an exploded view of the drawbar assembly 600 shown in FIG. 6. This drawbar assembly 600 is generally similar to the drawbar assembly 100 shown in FIGS. 1 and 2. This embodiment of the drawbar assembly 600 includes a shank 602 with adapter parts removably coupled to the shank by coupling the first adapter part 604 to the second adapter part 606 with a threaded fastener 608 that passes through a passage 618 in the shank and engages a threaded opening 620 in the second adapter part. The threaded fastener 608 may include a flat head that is received in a countersunk opening 616 in the first adapter part 604.

A threaded hitch pin 630 may provide an anti-rattle mechanism to secure the drawbar assembly 600 within a receiver. A hitch pin clamp 632 having a threaded passage 638 may be provided to secure the threaded hitch pin 630. A hairpin cotter pin 634 may be coupled to the threaded hitch pin 630 for provide a safety backup.

Figure 8:
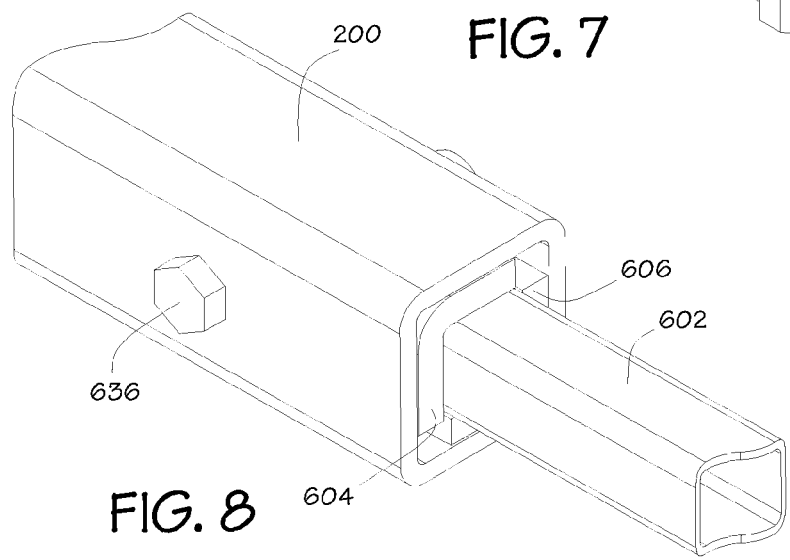
FIG. 8 is a perspective view of the drawbar assembly of FIG. 6 with a large exemplary receiver.

As shown in FIG. 8, the threaded hitch pin 630 may include a head 636 which may be sized such that the head will bear against the receiver 200 when the threaded hitch pin is inserted into hitch pin openings in the receiver. For example, the threaded hitch pin 630 may include a portion with a ½-13 screw thread and a hex head 636 with a width of ¾ of an inch. The head will bear against a nominal five-eights inch hitch pin opening of a class III receiver while the pin portion will fit within a nominal one-half inch hitch pin opening of a class I receiver.

As best seen in FIG. 7, the shank 602 of this embodiment is a hollow tube. The hitch pin clamp 632 is a short length of rectangular bar having a threaded passage 638. The hitch pin clamp 632 is inserted in the hollow interior portion of the shank 602 such that the threaded passage 638 is aligned with the passage 612 in the shank that receives the threaded hitch pin 630. The leading end of the threaded hitch pin 630 may be an unthreaded cylinder with a diameter that allows the unthreaded portion to pass through the threaded passage 638 of the hitch pin clamp 632. The threaded portion of the hitch pin 630 engages the threaded passage 638 of the hitch pin clamp 632 and clamps the shank 602 and possible the first adapter part 604 to the receiver 200.

The hitch pin clamp that is inserted in a hollow interior portion of the shank, the hitch pin clamp 632 may include resilient members 640 that retain the hitch pin clamp in the shank 602. in the embodiment shown, the resilient members are O-rings 640 that are encircle the hitch pin clamp 638 and are compressed against the interior portion of the shank 602 when the hitch pin clamp in inserted in the shank. The resilient members 640 may retain the hitch pin clamp 632 in the shank 602 by friction.

By screwing the threaded hitch pin 630 into the threaded passage 638 of the hitch pin clamp 632, the shank 602, with the first adapter part 604 if present, is drawn against the receiver 200. While the threaded hitch pin 630 has a diameter that can be received by the smaller hitch pin openings in a first hitch receiver, the head has a size that can bear against the second hitch receiver having larger hitch pin openings. Thus the threaded hitch pin 630 can clamp the drawbar assembly to the second hitch receiver even though the second pair of hitch pin openings have a substantially larger diameter than the first pair of hitch pin openings. This allows the same threaded hitch pin 630 and drawbar assembly 600 to be used with receivers with different sizes of hitch pin openings that may be substantially larger than the hitch pin.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A drawbar assembly comprising:
   a shank;
   a first adapter part having two sides forming a right angle, the first adapter part removably coupled to the shank;
   a second adapter part having two sides forming a right angle, the second adapter part removably coupled to the shank opposite the first adapter part.

2. The drawbar assembly of claim 1 further comprising a threaded fastener that removably couples the first and second adapter parts to the shank, the shank including a passage through which the threaded fastener passes, the first adapter part including a recessed opening that receives a head of the threaded fastener, and the second adapter part including a threaded opening that receives the threaded fastener.

3. The drawbar assembly of claim 1 wherein the head of the threaded fastener is a flat head and the recessed opening is a countersink.

4. The drawbar assembly of claim 1 further comprising:
   a hitch pin including a head and a threaded pin, the threaded pin passing through a passage in the shank and through a first hitch pin opening in a hitch receiver, the head fitting within a second hitch pin opening in the hitch receiver and bearing against the shank adjacent the passage; and
   a threaded nut coupled to the threaded pin such that the nut bears against the hitch receiver adjacent the first hitch pin opening and clamps the drawbar assembly to the hitch receiver.

5. The drawbar assembly of claim 1 further comprising:
   a hitch pin clamp that is inserted in a hollow interior portion of the shank, the hitch pin clamp having a threaded passage and including resilient members that retain the hitch pin clamp in the shank; and
   a threaded hitch pin that engages the threaded passage of the hitch pin clamp, the threaded hitch pin having a diameter that can be received by a hitch pin opening in a hitch receiver and a head that can bear against the hitch receiver and clamp the drawbar assembly to the hitch receiver.

6. The drawbar assembly of claim 5 wherein the resilient members are O-rings that are encircle the hitch pin clamp and are compressed against the interior portion of the shank.

7. The drawbar assembly of claim 5 wherein the threaded hitch pin has a maximum diameter of approximate one-half of an inch and the head has a width of at least three-quarters of an inch.

8. The drawbar assembly of claim 1 wherein the shank has a cross-section that is approximately one and one-quarter inches square and each of the sides of the first and second adapter parts are approximately three-eighths of an inch thick.

9. A method for adapting a shank that can slidingly engage a hitch receiver when the hitch receiver has an interior cross section that is approximately one and one-quarter inches square to be retained in the hitch receiver when the hitch receiver has an interior cross section that is approximately two inches square, the method comprising:
   removably coupling a first adapter part having two sides forming a right angle to the shank;
   removably coupling a second adapter part having two sides forming a right angle to the shank opposite the first adapter part.

10. The method of claim 9 further comprising coupling the first adapter part to the second adapter part with a threaded fastener that passes through the shank.

11. The method of claim 10 wherein the threaded fastener includes a flat heat that is received in a countersunk opening in the first adapter part.

12. The method of claim 9 further comprising:
    inserting a threaded hitch pin through a passage in the shank and through a pair of hitch pin openings in the hitch receiver, the hitch pin including a head that fits within one of the hitch pin openings and bears against the shank adjacent the passage; and
    tightening a nut on the threaded hitch pin against the outside of the hitch receiver to clamp the drawbar assembly to the hitch receiver.

13. The method of claim 9 further comprising:
    inserting a threaded hitch pin through a passage in the shank and the first and second adapter parts, and through a pair of hitch pin openings in the hitch receiver, the hitch pin including a head that fits within one of the hitch pin openings and bears against the first adapter part adjacent the passage; and
    tightening a nut on the threaded hitch pin against the outside of the hitch receiver to clamp the shank with the coupled first and second adapter parts to the hitch receiver.

14. The method of claim 9 further comprising:
    inserting a hitch pin clamp in a hollow interior portion of the shank, the hitch pin clamp having a threaded passage; and
    screwing a threaded hitch pin into the threaded passage of the hitch pin clamp, the threaded hitch pin having a diameter that can be received by a hitch pin opening in the hitch receiver and a head having a size that can bear against the hitch receiver and clamp the drawbar assembly to the hitch receiver.

15. The method of claim 14 further comprising encircling the hitch pin clamp with O-rings and compressing the O-rings between the hitch pin clamp and the interior portion of the shank to retain the hitch pin clamp in the shank.

16. The method of claim 14 wherein the threaded hitch pin has a maximum diameter of approximate one-half of an inch and the head has a width of at least three-quarters of an inch.

* * * * *